(12) United States Patent
Anderson et al.

(10) Patent No.: US 7,221,534 B2
(45) Date of Patent: May 22, 2007

(54) PIEZOELECTRIC CRYSTAL ACTUATOR AND TECHNIQUES FOR HYSTERESIS REDUCTION

(75) Inventors: James S. Anderson, Hugo, MN (US); Denis J. Langlois, River Falls, WI (US); Mark P. Weber, Oakdale, MN (US)

(73) Assignees: Imation Corp., Oakdale, MN (US); Sony Corporation, Tokyo (JP)

( * ) Notice: Subject to any disclaimer, the term of this patent is extended or adjusted under 35 U.S.C. 154(b) by 0 days.

(21) Appl. No.: 11/051,371

(22) Filed: Feb. 3, 2005

(65) Prior Publication Data

US 2006/0171060 A1    Aug. 3, 2006

(51) Int. Cl.
*G11B 5/584* (2006.01)
(52) U.S. Cl. ...................... 360/77.12; 360/69
(58) Field of Classification Search ................. 360/69, 360/77.12
See application file for complete search history.

(56) References Cited

U.S. PATENT DOCUMENTS

| | | | |
|---|---|---|---|
| 5,422,556 A | * | 6/1995 | Graf et al. .................. 318/701 |
| 5,450,257 A | * | 9/1995 | Tran et al. ..................... 360/76 |
| 2003/0123196 A1 | * | 7/2003 | Shiraishi et al. ......... 360/294.4 |
| 2005/0185344 A1 | | 8/2005 | Ito et al. |
| 2005/0201017 A1 | | 9/2005 | Koga et al. |

OTHER PUBLICATIONS

Co-pending U.S. Appl. No. 11/062,224, filed Feb. 18, 2005, Langlois et al., entitled "Techniques for Adjusting for Actuator Non-Linearities in a Data Storage System".

* cited by examiner

*Primary Examiner*—Fred F. Tzeng
(74) *Attorney, Agent, or Firm*—Eric D. Levinson

(57) ABSTRACT

The invention proposes the use of a piezoelectric crystal element as an actuator for data storage systems. In particular, the piezoelectric crystal element mechanically positions a head with respect to a data storage medium. More specifically, the invention may use a piezoelectric laminate crystal structure as a fine positioning actuator in a magnetic tape system in order to precisely position one or more heads with respect to tracks of the magnetic tape. Furthermore, in order to address hysteresis in the piezoelectric crystal element, the invention proposes the introduction of a high frequency periodic signal as part of the input to the piezoelectric crystal element.

17 Claims, 5 Drawing Sheets

PIEZOELECTRIC CRYSTAL ACTUATOR AND TECHNIQUES FOR HYSTERESIS REDUCTION

TECHNICAL FIELD

The invention relates to data storage media such as magnetic tape and, more particularly, to actuators for positioning heads with respect to data storage media.

BACKGROUND

Data storage media are commonly used for storage and retrieval of data, and come in many forms, such as magnetic tape, magnetic disks, optical tape, optical disks, holographic disks or cards, and the like. Magnetic tape media remains economical for storing large amounts of data. For example, magnetic tape cartridges, or large spools of magnetic tape, are often used to back up data in large computing centers. Magnetic tape cartridges also find application in the backup of data stored on smaller computers such as desktop or notebook computers.

In magnetic media, data is typically stored as magnetic signals that are magnetically recorded on the medium surface. The data stored on the medium may be organized along "data tracks," and transducer heads can be positioned relative to the data tracks to write data to the tracks or read data from the tracks. A typical magnetic storage medium, such as magnetic tape, may include several data tracks in a data band. Optical media, holographic media, and other media formats can also make use of data tracks. Linear data storage media refers to data storage media, such as magnetic tape or other data storage tape formats, in which data is stored in parallel tracks that extend linearly along the length of the media.

Servo patterns refer to signals or other recorded marks on the medium that are used for tracking purposes. In other words, servo patterns are recorded on the medium to provide reference points relative to the data tracks. A servo controller interprets detected servo patterns and generates position error signals. The position error signals are used as feedback to adjust the lateral distance of read or write heads relative to the data tracks so that the heads are properly positioned along the data tracks for effective reading and/or writing of the data to the data tracks. Time-based servo patterns and amplitude-based servo patterns are common in magnetic tape.

Actuators refer to the elements that mechanically position a head with respect to a data storage medium. For high density media, actuators may be responsive to position error signals, which are generated based on the readout of servo patterns recorded on the media surface. In some cases, a coarse positioning actuator can be used to position a head in general proximity to a desired location, and a fine positioning actuator can be used to precisely position the head in the desired location. The coarse positioning actuator may define a larger range of motion than the fine positioning actuator, but the fine positioning actuator has greater positioning accuracy.

SUMMARY

In general, the invention proposes the use of a piezoelectric crystal element as an actuator for data storage systems. The piezoelectric crystal element mechanically positions a head with respect to a data storage medium. More specifically, the invention may use a piezoelectric laminate crystal structure as a fine positioning actuator in a magnetic tape system in order to precisely position one or more heads with respect to tracks of the magnetic tape. Furthermore, in order to address hysteresis in the piezoelectric crystal element, the invention proposes the introduction of a high frequency periodic signal as part of the input to the piezoelectric crystal element.

In one embodiment, the invention provides a method comprising inputting a periodic signal to a piezoelectric crystal element to reduce hysteresis of the piezoelectric crystal element, and positioning a data storage head with respect to a data storage medium via the piezoelectric crystal element.

In another embodiment, the invention provides an apparatus comprising a data storage head, a piezoelectric crystal element coupled to the data storage head to control positioning of the data storage head with respect to a data storage medium, and a controller to provide input signals to the piezoelectric crystal element, the input signals including a periodic signal to reduce hysteresis of the piezoelectric crystal element and a drive signal to induce expansion or contraction of the piezoelectric crystal element to thereby position the data storage head with respect to the data storage medium.

In another embodiment, the invention provides a magnetic tape system comprising a magnetic tape, a magnetic head to read data from the magnetic tape or write data to the magnetic tape, and a piezoelectric crystal element to position the magnetic head with respect to the magnetic tape. The system may further comprise a controller to provide input signals to the piezoelectric crystal element, the input signals including a periodic signal to reduce hysteresis of the piezoelectric crystal element and a drive signal to induce expansion or contraction of the piezoelectric crystal element to thereby position the magnetic head with respect to the magnetic tape.

The various embodiments of the invention may be capable of providing one or more advantages. Specifically, piezoelectric crystal actuators can provide improvements over conventional actuators because of their relatively small size, small mass, high force generation and long life. Piezoelectric crystal actuators are particularly attractive for use as fine positioning actuators of heads in a magnetic tape system that also includes a conventional "coarse" actuator. In addition, by introducing a periodic signal as part of the input to the piezoelectric crystal actuator, hysteresis can be significantly reduced, which is desirable.

The details of one or more embodiments of the invention are set forth in the accompanying drawings and the description below. Other features, objects, and advantages of the invention will be apparent from the description and drawings, and from the claims.

DETAILED DESCRIPTION

This invention proposes the use of a piezoelectric crystal element as an actuator for data storage systems, such as magnetic tape systems, magnetic disk systems, or other types of data storage systems. In particular, the piezoelectric crystal element can mechanically position one or more heads with respect to a data storage medium. In one embodiment, the invention makes use of a piezoelectric laminate crystal structure as an actuator in a magnetic tape system in order to precisely position one or more heads with respect to tracks of the magnetic tape. Another actuator, i.e., a coarse positioning actuator, may also be used in the system to coarsely position the heads. In that case, the piezoelectric crystal element serves as a fine positioning actuator for the system.

One problem with piezoelectric crystals, however, is hysteresis. Hysteresis is generally a phenomenon of piezoelectric motion in which a change in input voltage to the piezoelectric crystal element does not linearly equate to desired expansion or contraction of the piezoelectric crystal element. In particular, hysteresis can be viewed as a form of "memory" in the piezoelectric crystal element, or a non-linear response of the piezoelectric crystal element. When hysteresis is present, the motion induced by an input voltage change is partially dependent upon the current state of the piezoelectric crystal element. In order to reduce this hysteresis in the piezoelectric crystal element, the invention introduces a high frequency periodic signal as part of the input to the piezoelectric crystal element. The high frequency periodic signal significantly reduces hysteresis, making piezoelectric crystal elements better suited for use as an actuator in a data storage system.

Figure 1:
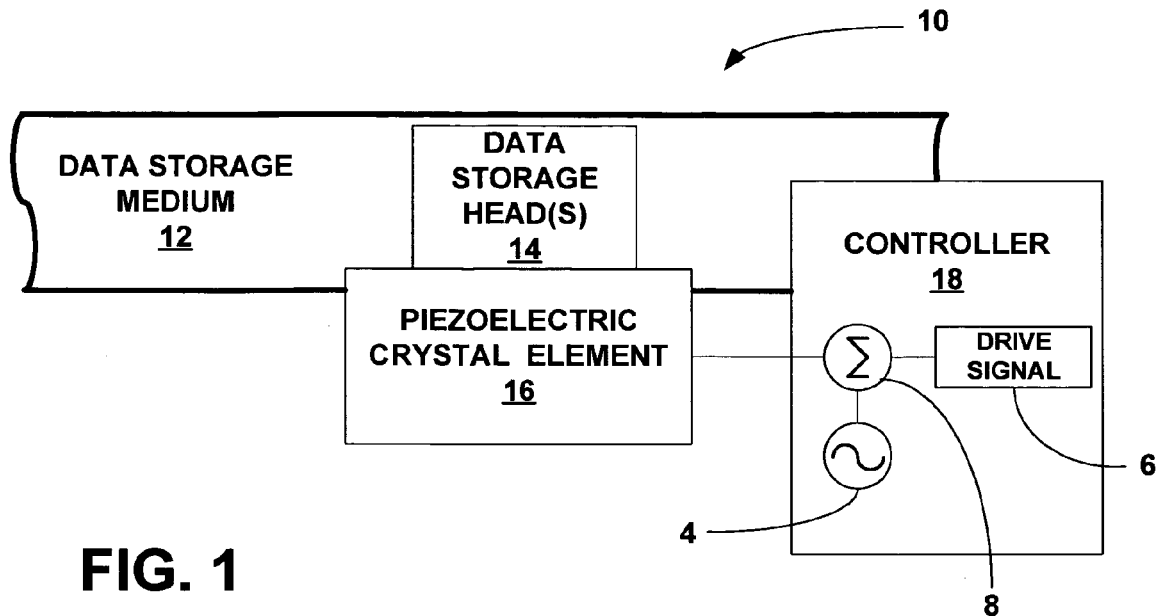
FIGS. 1–3 are block diagrams of a data storage systems according to embodiments of the invention.

FIG. 1 is a block diagram of a data storage system 10 according to an embodiment of the invention. As shown, a piezoelectric crystal element 16 controls lateral positioning of one or more data storage heads 14 with respect to data storage medium 12. Controller 18 provides input signals to piezoelectric crystal element 16 to cause piezoelectric crystal element 16 to expand or contract and thereby position heads 14 with respect to medium 12.

Data storage medium 12 may comprise any of a wide variety of media useful for information storage and retrieval. Examples of data storage medium 12 include linear media such as magnetic tape, magneto optic tape, holographic tape, or other tape formats. Other examples may include a magnetic disk, an optical disk, a magneto-optic disk, holographic disks or cards, or any other data storage media format. In the following description, many aspects of the invention are described in the context of a data storage medium 12 that comprises magnetic tape. The invention, however, may find application in many other data storage media systems that make use of a head that is positioned by an actuator. In such cases, the head generally refers to any element used to read data from a medium or write data to the medium.

The format of heads 14 may be dictated by the format of medium 12. For magnetic tape, heads 14 may include any of a wide variety of heads that have been developed for read and/or write functionality. In magnetic tape systems, the heads typically contact the tape. Examples of heads 14 for use in a magnetic tape system include magneto-resistive (MR) heads, giant magneto-resistive (gMR) heads, inductive heads, thin film heads, C-core heads that include an excitation coil around the C-core, and a wide variety of other types of heads. Heads 14 may include one or more write heads that can write data, and/or one or more read heads that can read data written by the write heads, e.g., for verification of data as it is written. Some heads can both read and write data, and may be used as either a read element or a write element. Other types of heads are only suited for reading or writing.

Heads 14 may also include one or more servo heads, which are specific types of read heads designed specifically to read servo marks, e.g., of a time-based or amplitude-based servo pattern on the surface of medium 12. In that case, the servo heads may provide input to controller 18 for closed-loop feedback control or the positioning of heads 14.

Piezoelectric crystal element 16 may comprise any type of piezoelectric crystal. One example of piezoelectric crystal element 16 is a laminate piezoelectric crystal stack, which is driven by a voltage through its range of motion. In that case, voltage changes across piezoelectric crystal element 16 can cause expansion or contraction of piezoelectric crystal element 16 to induce desired lateral motion of heads 14 to position heads 14 with respect to medium 12. Another example of piezoelectric crystal element 16 is "bi-morph" piezoelectric crystal structure, which comprises flat piezoelectric crystals that are glued together. A bi-morph piezoelectric crystal structure bends in response to voltage changes applied across the crystals because the different layers expand or contract differently. In the following description, it is assumed that piezoelectric crystal element 16 comprises a laminate piezoelectric crystal stack, as these are more preferred. However, the invention is not limited in this respect and may find application with "bi-morph" piezoelectric crystal structures or other piezoelectric crystal elements.

Controller 18 provides input signals to piezoelectric crystal element 16 to cause piezoelectric crystal element 16 to expand or contract and thereby position heads 14 with respect to medium 12. Drive signal 6 may comprise a suitable voltage to cause such expansion or contraction in piezoelectric crystal element 16. Drive signal 6 may comprise a substantially constant voltage. Moreover, in order to reduce hysteresis effects in piezoelectric crystal element 16, controller 18 also provides a high frequency periodic signal to piezoelectric crystal element 16. The periodic signal may comprise a periodic voltage, e.g., a sinusoidal voltage, an oscillating voltage defined by a square wave or saw-tooth wave, or any other repeating voltage waveform. Oscillator 4 may generate the periodic signals, which are combined with drive signal 6 by summation unit 8. In this manner, the input signals to piezoelectric crystal element 16 include a periodic signal to reduce hysteresis of the piezoelectric crystal element 16 and a drive signal to induce expansion or contraction of piezoelectric crystal element 16 to thereby position data storage heads 14 with respect to data storage medium 12.

Figure 2:
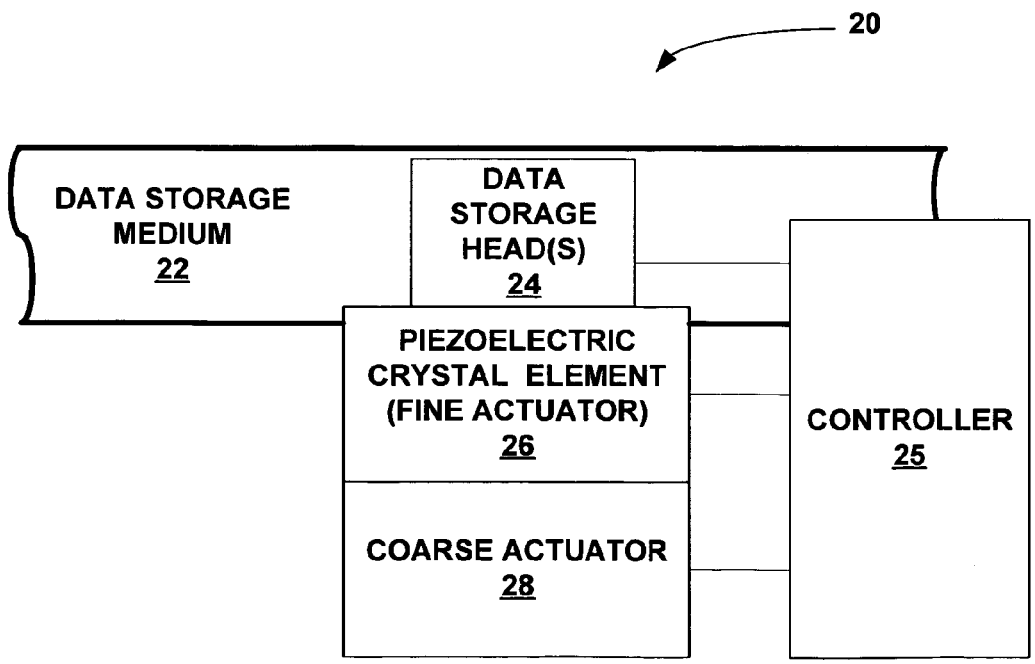

FIG. 2 is another block diagram of a data storage system 20 according to an embodiment of the invention. In this embodiment, system 20 includes two actuators, a coarse actuator 28 and a fine actuator 26. Fine actuator 26 comprises a piezoelectric crystal element as described herein, and may receive input signals from controller 25 that include a periodic signal to reduce hysteresis of the piezoelectric crystal element. In any case, both coarse actuator 28 and fine actuator 26 control lateral positioning of one or more data storage heads 24 with respect to data storage medium 22.

Controller 25 provides input signals to both coarse actuator 28 and fine actuator 26 to cause the desired motion in actuators 26, 28 and thereby position heads 24 with respect to medium 22.

Coarse actuator 28 may define a larger range of motion than the fine actuator 26, but fine actuator 26 has greater positioning accuracy. As mentioned, fine actuator 26 comprises a piezoelectric crystal element as described herein. Coarse actuator 28 may comprise any of a wide variety of conventional actuators, such as a stepper motor, a voice coil, a ball screw actuator, a wiggle-worm actuator, or another type of actuator.

Figure 3:
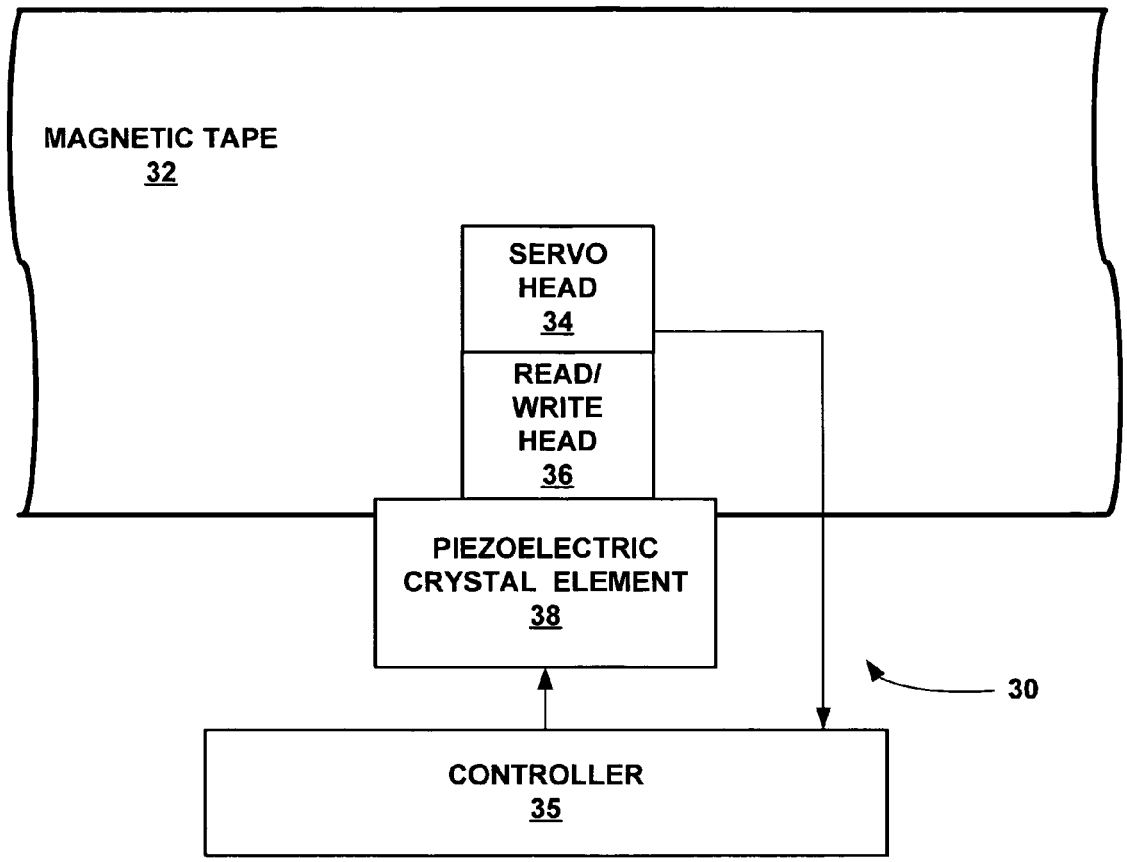

FIG. 3 is another block diagram of a data storage system 30 according to an embodiment of the invention. In this embodiment, system 30 is specifically illustrated as including a servo head 34 and a read/write head 36. Piezoelectric crystal element 38 comprises the actuator that positions heads 34 and 36 with respect to data storage medium 32. Piezoelectric crystal element 38 may receive input signals from controller 35 that include a drive signal to cause motion in a piezoelectric crystal element 38 and a periodic signal to reduce hysteresis of the piezoelectric crystal element. Servo head 34 detects recorded servo patterns from data storage medium 32 in order to provide feedback to controller 35. Controller 35 generates and deciphers position error signals, which are generated based on the detected servo patterns, and adjusts the lateral positioning of heads 34 and 36 by driving piezoelectric crystal element 38. In other words, controller 35, piezoelectric crystal element 38, and servo head 34 form a closed-loop positioning system that converges read/write head 36 to the proper track of data storage medium 32.

Figure 4:
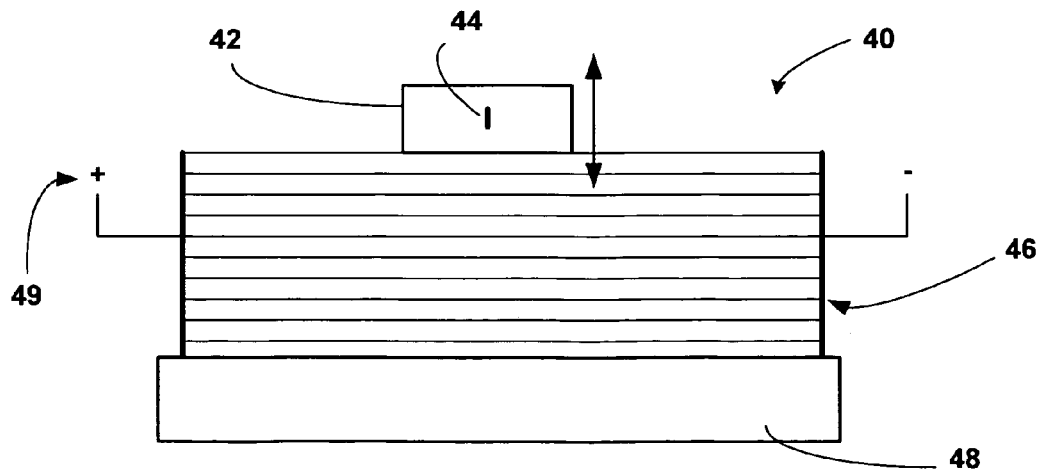
FIG. 4 is a conceptual side view of an exemplary piezoelectric crystal actuator.

FIG. 4 is a conceptual side view of an exemplary piezoelectric crystal actuator 40. Piezoelectric crystal actuator 40 comprises a piezoelectric laminate stack 46 that includes a plurality of piezoelectric layers. Piezoelectric laminate stack 46 may be formed over a substrate 48. When a voltage 49 is applied across piezoelectric laminate stack 46, the piezoelectric laminate stack 46 may expand or contract. A magnetic head 42 that defines a magnetic gap 44 for magnetic recording or readout, is positioned on piezoelectric laminate stack 46. Therefore, expansion or contraction of piezoelectric laminate stack 46 can cause lateral motion of magnetic head 42 to thereby position magnetic gap 44 with respect to a data track of a magnetic medium.

By way of example, piezoelectric laminate stack 46 may define a thickness on the order of approximately 2.5 centimeters. In that case, piezoelectric laminate stack 46 may define a range of motion on the order of approximately 15 microns. Piezoelectric crystal actuator 40 may respond to input much faster than conventional voice coil actuators. In addition, relative to conventional actuators, piezoelectric crystal actuator 40 may define a relatively small size, small mass, high force generation and long useful life.

As described herein, in order to address hysteresis in piezoelectric crystal actuator 40, a high frequency periodic signal may be included as part of the input signal that drives piezoelectric crystal actuator 40 to expand or contract. The periodic signal may comprise an oscillating voltage having a frequency greater than 20% of the resonance frequency of piezoelectric laminate stack 46, but less than 180% of the resonance frequency of piezoelectric laminate stack 46 in order to avoid second order harmonic affects.

Figure 5:
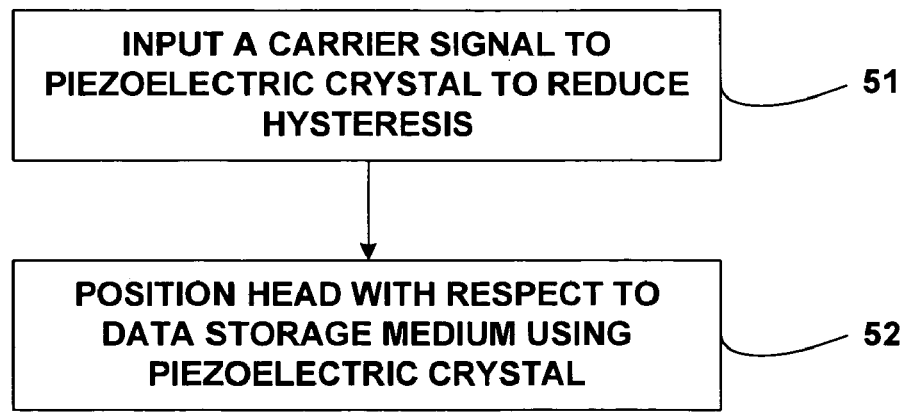
FIGS. 5 and 6 are flow diagrams illustrating techniques according to embodiments of the invention.

FIG. 5 is a flow diagram illustrating a technique according to an embodiment of the invention. FIG. 5 will be described with reference to system 10 of FIG. 1. As shown in FIG. 5, controller 18 inputs a periodic signal to piezoelectric crystal element 16 to reduce hysteresis (51). In particular, controller 18 may include an oscillator 4 for generating the periodic signal. As mentioned above, the periodic signal may comprise an oscillating voltage having a frequency greater than 20% of the resonance frequency of piezoelectric crystal element 16. In addition, the periodic signal may define a frequency less than 180% of the resonance frequency of piezoelectric crystal element 16 in order to avoid second order harmonic affects. By way of example, if piezoelectric crystal element 16 defines a resonance frequency of approximately 35 kilohertz (kHz), the periodic signal may comprise an amplitude modulated carrier having a frequency on the order of approximately 50 kHz. The frequency of the periodic signal should typically be greater than the bandwidth of piezoelectric crystal element 16.

As further shown in FIG. 5, piezoelectric crystal element 16 positions one or more heads 14 with respect to data storage medium (52). In particular, controller 18 may generate a drive signal 6 that causes the desired expansion or contraction of piezoelectric crystal element 16. Controller 18 may include a summation unit 8 that combines the periodic signal from oscillator 4 with drive signal 6, so that a single input can be provided to piezoelectric crystal element 16 to both drive the desired expansion or contraction and introduce an oscillating periodic signal that reduces hysteresis in piezoelectric crystal element 16.

Figure 6:
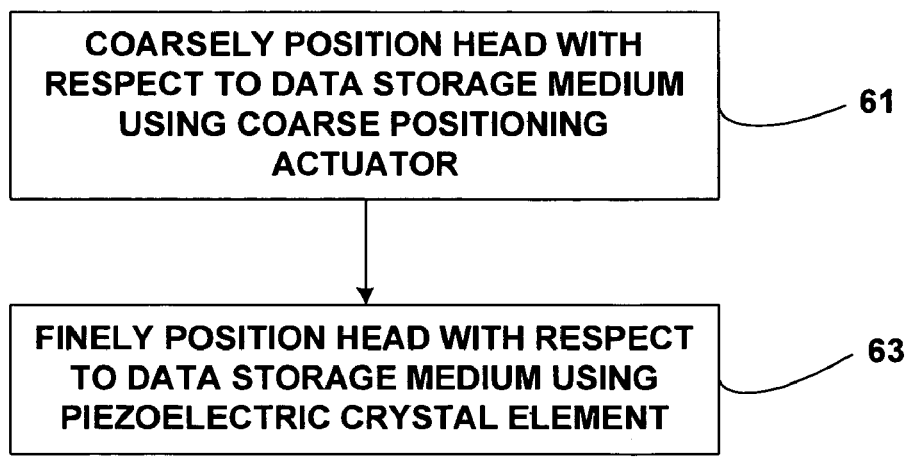

FIG. 6 is another flow diagram illustrating a technique according to an embodiment of the invention. FIG. 6 will be described with reference to system 20 of FIG. 2. As shown in FIG. 6, coarse actuator 28 coarsely positions one or more heads 24 with respect to data storage medium 22 (61). Fine actuator 26, which comprises a piezoelectric crystal element, then finely positions heads 24 with respect to data storage medium 22 (63). Moreover, in order to reduce hysteresis, step 63 of FIG. 6 may comprise the process of FIG. 5 described above.

Figure 7:
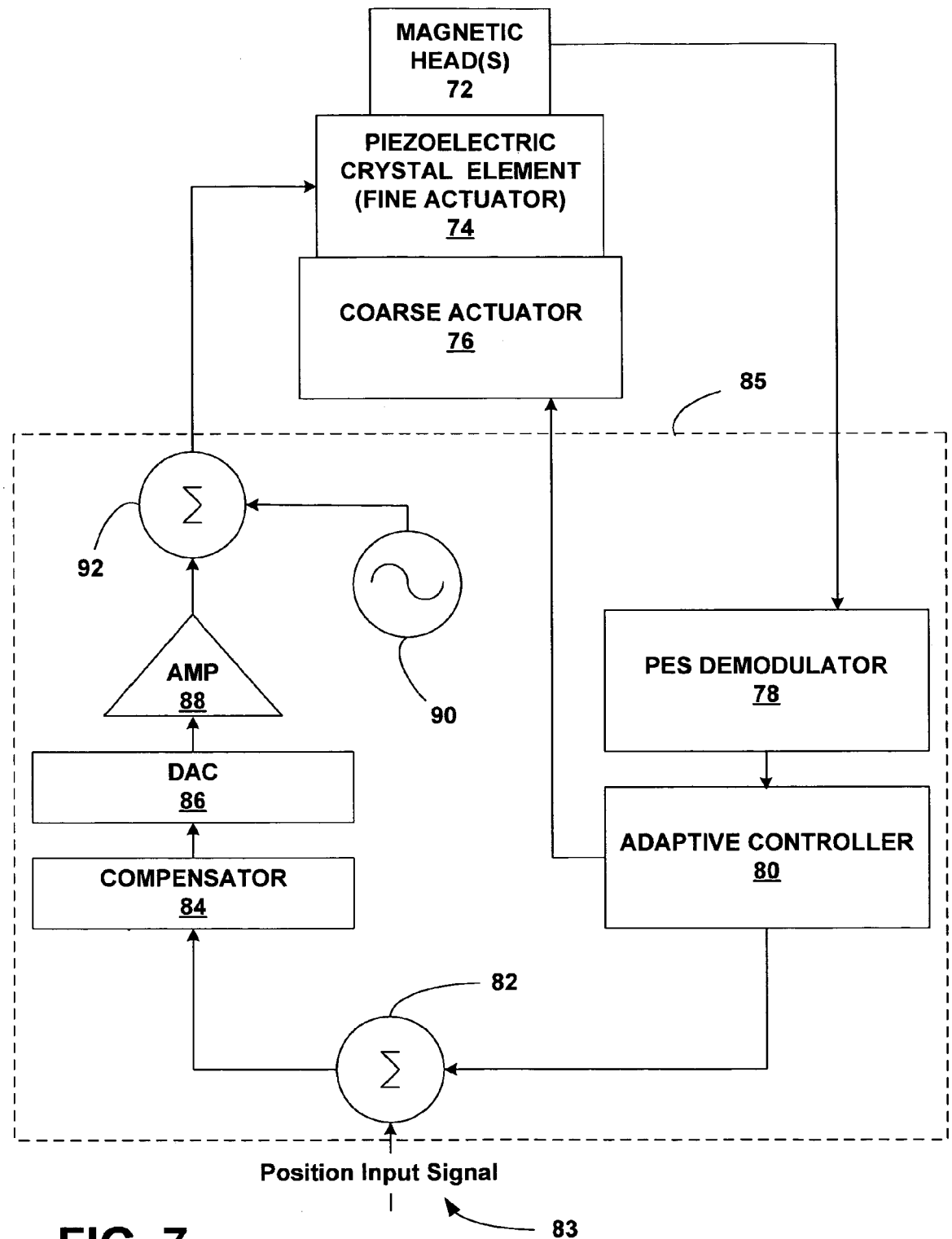
FIG. 7 is a block diagram of one embodiment of an apparatus that can be used to position magnetic heads with respect to magnetic tape.

FIG. 7 is a more detailed block diagram of one embodiment of an apparatus 70 that can be used to position magnetic heads 72 with respect to magnetic tape (not shown in FIG. 7). System 70 includes two actuators, a coarse actuator 76 and a fine actuator 74. Fine actuator 74 comprises a piezoelectric crystal element as described herein, and may receive input signals from controller 85 that include a periodic signal to reduce hysteresis of the piezoelectric crystal element. In any case, both coarse actuator 76 and fine actuator 74 control lateral positioning of heads 72 with respect to a data storage medium (not shown). Coarse actuator 76 may define a larger range of motion than the fine actuator 74, but fine actuator 74 has greater positioning accuracy.

Magnetic heads 72 include one or more servo heads and one or more read or write heads. The servo heads provide input to controller 85 used to facilitate closed loop servo-positioning. Controller 85 receives position input signal 82 and causes contraction or expansion of fine actuator 74 to position magnetic heads 72. Any residual error in the position of heads 72 is then adjusted in the servo loop of controller 85.

Specifically, PES demodulator 78 receives signals detected by servo head elements of heads 72. PES demodulator 78 demodulates a detected servo signal to generate a position error signal. Adaptive controller 80 examines the position error signal and performs any adjustments to coarse actuator 76, if necessary. Summation unit 82 sums the position error signal with position input signal 83 in order to compensate for any detected misalignment of the servo head with respect to a servo pattern. Position input signal 83 may comprise the initial input to controller 85 defining the desired position of magnetic heads 72.

Compensator 84 receives the output of summation unit 82 and generates a compensation signal indicative of an adjustment to be made by fine actuator 74. DAC 86 comprises a digital-to-analog converter to generate a voltage signal based on the output of compensator 84. Amplifier 88 amplifies the output of DAC 86 to generate a drive signal that will cause expansion or contraction of the piezoelectric crystal element of fine actuator 74.

The drive signal from amplifier 88 may comprise a suitable voltage to cause such expansion or contraction in the piezoelectric crystal element of fine actuator 74. In order to reduce hysteresis effects in the piezoelectric crystal element of fine actuator 74, controller 85 also generates high frequency periodic signals. Oscillator 90 generates the periodic signals, which are combined with the drive signal by summation unit 92. In this manner, the input signals to the piezoelectric crystal element of fine actuator 74 include a periodic signal to reduce hysteresis and a drive signal to induce expansion or contraction of piezoelectric crystal element to thereby position data storage heads 72 with respect to a data storage medium.

Figure 8:
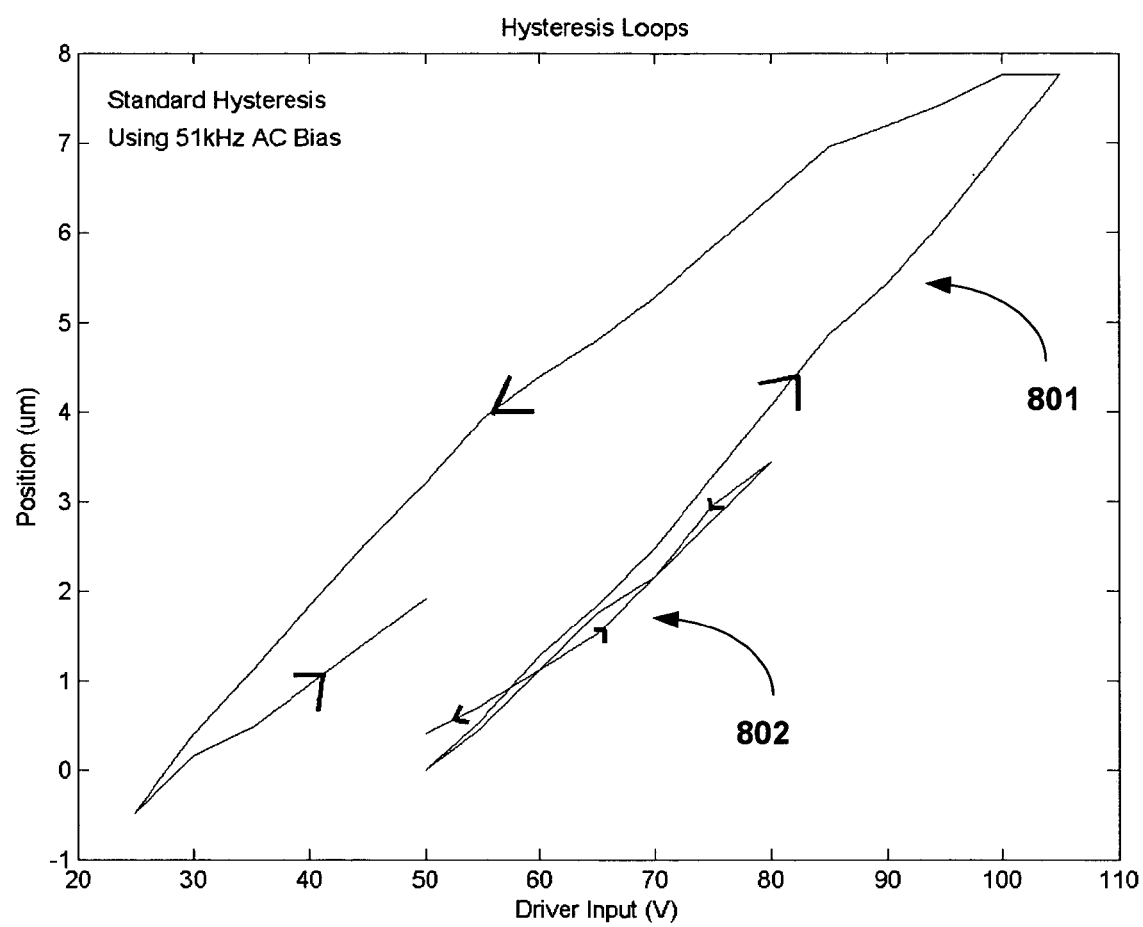
FIG. 8 is a graph of experimental data relating to a piezoelectric laminate stack being driven through its range of motion with and without periodic signals to reduce hysteresis.

FIG. 8 is a graph of experimental data relating to a piezoelectric laminate stack being driven through its range of motion with and without periodic signals to reduce hysteresis. Trace 801 shows such motion without the periodic signals, in which the piezoelectric laminate stack defined approximately 8 microns of motion and hysteresis of approximately 4 microns. Trace 802 shows the motion of the piezoelectric laminate stack when a 51 kHz periodic signal was added to the input. As can be seen by trace 802, the motion of the piezoelectric laminate stack was approximately 3 microns with only approximately 0.25 microns of hysteresis.

A number of embodiments of the invention have been described. For example, a piezoelectric crystal element actuator has been described to mechanically position a head with respect to a data storage medium. Furthermore, in order to address hysteresis in the piezoelectric crystal element, this disclosure has described the introduction of a high frequency periodic signal as part of the input to the piezoelectric crystal element. Although the invention has been specifically described in the context of a magnetic tape system, it may find application in a wide variety of other data storage systems. These and other embodiments are within the scope of the following claims.

The invention claimed is:

1. A method comprising:
inputting a periodic signal to a piezoelectric crystal element to reduce hysteresis of the piezoelectric crystal element; and
positioning a data storage head with respect to a data storage medium via the piezoelectric crystal element, wherein positioning the data storage head comprises applying a drive signal across the piezoelectric crystal element in addition to the periodic signal, wherein the drive signal comprises a constant voltage and the periodic signal comprises a sinusoidal voltage.

2. The method of claim 1, further comprising defining the drive signal to be applied across the piezoelectric crystal element in response to position error signals generated from detected servo patterns on the data storage medium.

3. The method of claim 1, wherein the piezoelectric crystal element comprise a piezoelectric laminate structure, the data storage head comprises a magnetic head, and the data storage medium comprises magnetic tape.

4. The method of claim 1, further comprising:
coarsely positioning the data storage head with respect to a data storage medium via a coarse positioning actuator; and
finely positioning the data storage head with respect to a data storage medium via the piezoelectric crystal element.

5. An apparatus comprising:
a magnetic head that comprises one of a write head, a read head, a servo head and a verify head;
a piezoelectric crystal element coupled to the magnetic head to control positioning of the magnetic head with respect to a data storage medium; and
a controller to provide input signals to the piezoelectric crystal element, the input signals including a periodic signal to reduce hysteresis of the piezoelectric crystal element and a drive signal to induce expansion or contraction of the piezoelectric crystal element to thereby position the data storage head with respect to the data storage medium, wherein the drive signal comprises a constant voltage and the periodic signal comprises a sinusoidal voltage and wherein the drive signal is applied across the piezoelectric crystal element in addition to the periodic signal.

6. The apparatus of claim 5, wherein the piezoelectric crystal element comprises a piezoelectric laminate structure.

7. The apparatus of claim 6, wherein the piezoelectric laminate structure defines a thickness on the order of approximately 2.5 centimeters and defines a range of motion on the order of approximately 15 microns.

8. The apparatus of claim 5, wherein the piezoelectric crystal element comprises a fine positioning element that finely positions the magnetic head, the apparatus further comprising a coarse positioning element to coarsely position the magnetic head.

9. The apparatus of claim 5, wherein the periodic signal defines a frequency on the order of approximately 50 kHz.

10. The apparatus of claim 5, wherein the controller generates the drive signal in response to position error signals generated from detected servo patterns on the data storage medium.

11. A magnetic tape system comprising:
a magnetic tape;
a magnetic head to read data from the magnetic tape or write data to the magnetic tape;
a piezoelectric crystal element to position the magnetic head with respect to the magnetic tape; and
a controller to provide input signals to the piezoelectric crystal element, the input signals including a periodic signal to reduce hysteresis of the piezoelectric crystal element and a drive signal to induce expansion or contraction of the piezoelectric crystal element to thereby position the magnetic head with respect to the magnetic tape, wherein the drive signal comprises a constant voltage and the periodic signal comprises a sinusoidal voltage and wherein the drive signal is applied across the piezoelectric crystal element in addition to the periodic signal.

12. The magnetic tape system of claim 11, wherein the magnetic head comprises a write head.

13. The magnetic tape system of claim 12, further comprising a read head to verify signals written by the write head, and a servo head to detect servo signals recorded on the magnetic tape, wherein the controller generates the drive signal in response to servo signals detected by the servo head.

14. The magnetic tape system of claim 11, wherein the piezoelectric crystal element comprises a piezoelectric laminate structure.

15. The magnetic tape system of claim 13, wherein the piezoelectric crystal element comprises a fine positioning element that finely positions the data storage head, the apparatus further comprising a coarse positioning element to coarsely position the data storage head.

16. A magnetic tape system comprising:
a magnetic tape;
a magnetic head to read data from the magnetic tape or write data to the magnetic tape; and
a piezoelectric crystal element to position the magnetic head with respect to the magnetic tape, wherein the piezoelectric crystal element comprises a piezoelectric laminate structure and wherein the piezoelectric laminate structure defines a thickness on the order of approximately 2.5 centimeters and defines a range of motion on the order of approximately 15 microns, wherein the periodic signal defines a frequency on the order of approximately 50 kHz.

17. An apparatus comprising:
a data storage head;
a piezoelectric crystal element coupled to the data storage head to control positioning of the data storage head with respect to a data storage medium; and
a controller to provide input signals to the piezoelectric crystal element, the input signals including a periodic signal to reduce hysteresis of the piezoelectric crystal element and a drive signal to induce expansion or contraction of the piezoelectric crystal element to thereby position the data storage head with respect to the data storage medium, wherein the drive signal comprises a constant voltage and the periodic signal comprises a sinusoidal voltage and wherein the drive signal is applied across the piezoelectric crystal element in addition to the periodic signal.

* * * * *